(12) United States Patent
Jones et al.

(10) Patent No.: US 10,851,990 B2
(45) Date of Patent: Dec. 1, 2020

(54) SYSTEM AND METHOD TO IMPROVE COMBINED CYCLE PLANT POWER GENERATION CAPACITY VIA HEAT RECOVERY ENERGY CONTROL

(71) Applicant: General Electric Company, Schenectady, NY (US)

(72) Inventors: Charles Michael Jones, Ballston Lake, NY (US); Robert John Gdaniec, Ballston Lake, NY (US); Raub Warfield Smith, Ballston Lake, NY (US); Francois Droux, Oberrohrdorf (CH)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 16/292,542

(22) Filed: Mar. 5, 2019

(65) Prior Publication Data
US 2020/0284427 A1    Sep. 10, 2020

(51) Int. Cl.
*F22B 35/00* (2006.01)
*F01K 23/10* (2006.01)
*F01K 13/02* (2006.01)
*F01K 7/16* (2006.01)

(52) U.S. Cl.
CPC ............ *F22B 35/007* (2013.01); *F01K 7/165* (2013.01); *F01K 13/02* (2013.01); *F01K 23/101* (2013.01)

(58) Field of Classification Search
CPC ........ F22B 35/007; F01K 7/165; F01K 13/02; F01K 23/101

USPC ....................................................... 60/39.182
See application file for complete search history.

(56) References Cited

U.S. PATENT DOCUMENTS

| 5,109,665 A * | 5/1992 | Hoizumi ............... F01K 23/101 122/7 R |
| 5,423,272 A | 6/1995 | Dunn, Jr. et al. |
| 5,428,953 A * | 7/1995 | Siga ........................ C22C 38/44 60/39.182 |
| 5,555,849 A | 9/1996 | Wiechard et al. |
| 6,237,542 B1 * | 5/2001 | Nakajo ................. F22B 1/1815 122/420 |
| 6,363,711 B2 | 4/2002 | Schmid et al. |
| 7,385,300 B2 * | 6/2008 | Huff ....................... G06Q 10/04 290/40 F |

(Continued)

FOREIGN PATENT DOCUMENTS

EP    2 615 265 B1    7/2013
WO    2017111932 A1   6/2017

*Primary Examiner* — Hoang M Nguyen
(74) *Attorney, Agent, or Firm* — Eversheds Sutherland (US) LLP (57) ABSTRACT

The present application provides an energy control computing device for adjusting one or more steam flow parameters delivered to a steam turbine from a heat recovery steam generator via a number of control devices. The energy control computing device includes a processor in communication with a memory. The processor is programmed to receive a number of measured operating values, identify steam turbine operating limits, identify a number of candidate operating modes meeting steam turbine operating limits, selecting the candidate operating mode maximizing the steam flow parameters while not exceeding the steam turbine operating limits, and directing the control devices to meet the selected candidate operating mode.

19 Claims, 3 Drawing Sheets

(56) References Cited

U.S. PATENT DOCUMENTS

| | | |
|---|---|---|
| 9,410,451 B2 | 8/2016 | Laing et al. |
| 9,593,844 B2 | 3/2017 | Brückner et al. |
| 10,041,378 B2 | 8/2018 | Tong et al. |
| 2002/0083903 A1 | 7/2002 | Liebig |
| 2004/0025510 A1 | 2/2004 | Schwarzott |
| 2007/0113562 A1 | 5/2007 | Tomlinson et al. |
| 2010/0305768 A1 | 12/2010 | Holt et al. |
| 2011/0036096 A1 | 2/2011 | Bommareddy et al. |
| 2012/0095701 A1 | 4/2012 | Julian et al. |
| 2012/0260667 A1 | 10/2012 | Chillar et al. |
| 2012/0290225 A1 | 11/2012 | Julian et al. |
| 2015/0082803 A1 | 3/2015 | Droux et al. |
| 2015/0090202 A1* | 4/2015 | Nenmeni ............ F22B 1/1815 122/7 R |
| 2015/0114319 A1 | 4/2015 | Drouvot et al. |
| 2016/0201518 A1* | 7/2016 | Tong .................. F01K 13/02 60/774 |
| 2017/0241298 A1* | 8/2017 | Petzen, III ........... F01K 23/101 |
| 2018/0163570 A1 | 6/2018 | Gupta et al. |
| 2018/0216496 A1 | 8/2018 | Smith et al. |

\* cited by examiner

SYSTEM AND METHOD TO IMPROVE COMBINED CYCLE PLANT POWER GENERATION CAPACITY VIA HEAT RECOVERY ENERGY CONTROL

TECHNICAL FIELD

The present application and the resultant patent relate generally to combined cycle power generation systems and more particularly relate to systems and methods to maximize bottoming cycle process steam or power output when the topping cycle exhaust energy exceeds the bottoming cycle capability to effectively utilize the exhaust energy.

BACKGROUND OF THE INVENTION

A combined cycle power plant combines at least one gas turbine with at least one steam turbine to produce power at the output of the steam turbine. The gas turbine operates as a prime mover to produce work according to the Brayton Cycle ("topping cycle"). The hot exhaust gases from the turbine section of the gas turbine are typically directed to a heat recovery steam generator ("HRSG"), which produces steam from the recovered heat, with the steam being provided to the steam turbine. The steam turbine output according to the Rankine Cycle is typically used to generate electrical power ("bottoming cycle"). The combined cycle power plant also includes appropriate controls (e.g., one or more computer control systems) and other types of components (e.g., valves, condenser, condensate pump, and the like).

When the topping cycle exhaust energy exceeds the bottoming cycle capability to utilize the energy, known methods of reducing the energy supplied to the bottoming cycle including the use of an exhaust gas bypass stack with a damper. In the case where the use of an exhaust gas bypass stack requires additional emissions reduction equipment, significant physical or capital investment may be required to provide a reduction in the exhaust energy directed to the bottoming cycle. For example, the use of an additional dump condenser or providing a larger system condenser than would otherwise be needed may be required. Also, in such methods, the gas bypass must be controlled with respect to the most limiting piece of bottoming cycle equipment.

There is thus a desire for improved systems and method for maximizing the exhaust energy delivered to the bottoming cycle in a combined cycle system. Preferably such improved bottoming cycle systems and methods may provide maximum efficiency with reduced overall costs.

SUMMARY OF THE INVENTION

The present application and the resultant patent thus provide an energy control computing device for adjusting one or more steam flow parameters delivered to a steam turbine from a heat recovery steam generator via a number of control devices. The energy control computing device includes a processor in communication with a memory. The processor is programmed to receive a number of measured operating values, identify steam turbine operating limits, identify a number of candidate operating modes meeting steam turbine operating limits, selecting the candidate operating mode maximizing the steam flow parameters while not exceeding the steam turbine operating limits, and directing the control devices to meet the selected candidate operating mode.

The present application and the resultant patent further provide a method of adjusting one or more steam flow parameters delivered to a steam turbine from a heat recovery steam generator via a number of control devices in communication with a number of valves. The method includes the steps of receiving a number of measured operating values, identifying the steam turbine operating limits, identifying a number of candidate operating modes meeting steam turbine operating limits, selecting the candidate operating mode maximizing the steam flow parameters while not exceeding steam turbine operating limits, and directing the control devices to adjust the valves to meet the selected candidate operating mode.

The present application and the resultant patent further provide a combined cycle system. The combined cycle system may include a heat recovery steam generator, a steam turbine in communication with the heat recovery steam generator, and an energy control system for adjusting one or more steam flow parameters of the flow of steam delivered to the steam turbine from the heat recovery steam generator via a number of control devices. The energy control system maximizing the steam flow parameters of the flow of steam from the heat recovery steam generator without exceeding steam turbine operating limits.

These and other features and improvements of the present application and the resultant patent will become apparent to one of ordinary skill in the art upon review of the following detailed description when taken in conjunction with the several drawings and the appended claims.

DETAILED DESCRIPTION

Under certain operating scenarios, the energy production of the various steam pressure energy levels in the heat recovery equipment may need to be limited so as to maximize bottoming cycle energy or power output while respecting multiple bottoming cycle equipment operating limitations. Specifically, an energy control computing device may monitor the operating limitations and may control the transition of the heat recovery equipment energy steam output while respecting heat recovery and bottoming cycle equipment limits and directing the equipment to arrive at the optimal conditions for maximizing bottoming cycle output or energy production. When equipment operating limits have changed, the computing device may calculate a new best operating state and may direct the system components and devices to achieve the new operating state while respecting operating limits during the transition.

More specifically, the energy control computing device may use a number of sensors to identify a current plant operating state represented by a number of measured plant operating values to determine flow, pressure, temperature velocity, energy data of various working fluids, and/or other parameters. The energy control computing device may receive a number of input parameters from a number of sensors, data sources, or model simulations. The input parameters may include any type of suitable data including measured plant operating values, plant design information, and other types of plant status information. In at least some examples, the input parameters may include heat balance values such as temperature levels, pressure levels, pressure differential levels, mass flow rates, and enthalpies. Further, the energy control computing device may receive plant design information including equipment geometry and the maximum allowable steam flow, pressure, temperature, and velocity levels.

Figure 1:
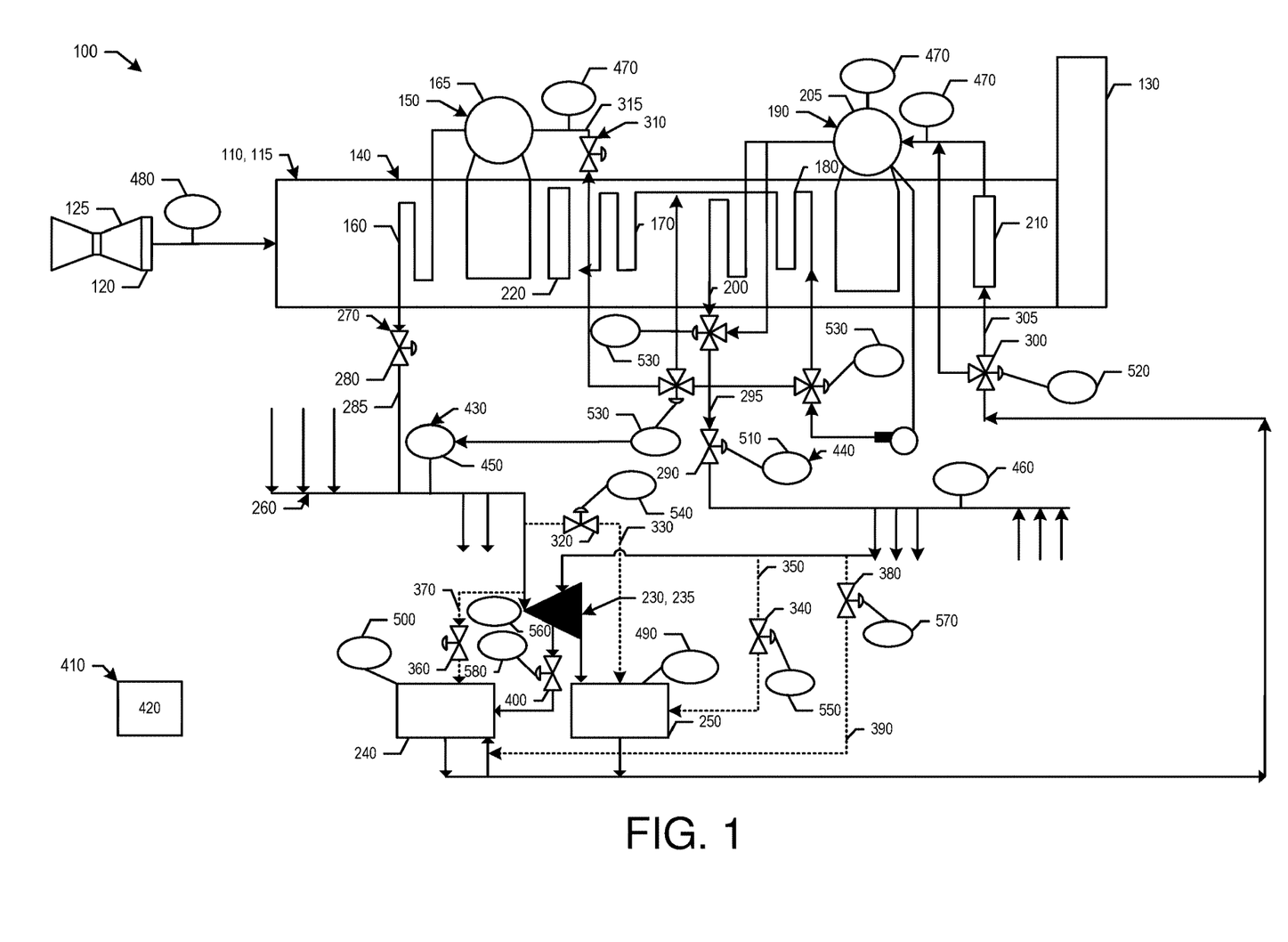
FIG. 1 is a schematic diagram of an exemplary gas turbine combined cycle facility as may be described herein.

FIG. 1 is a schematic diagram of a gas turbine combined cycle facility 100 as may be described herein. In this example, the gas turbine combined cycle facility 100 may include at least one heat recovery steam generator 110. Any number of the heat recovery steam generator's 110 may be used herein. The heat recovery steam generator 110 may be coupled in flow communication with an exhaust duct 120 of a gas turbine engine 125 in a topping cycle 115 on one end and an exhaust stack 130 on the other. The heat recovery steam generator 110 may include number of pressure sections 140. The pressure sections 140 may a high pressure section 150. The high pressure section 150 may include at least one high pressure superheater 160, a high pressure header 165, and at least one high pressure economizer. In this example, a first high pressure economizer 170 and a second high pressure economizer 180 are shown. The pressure sections 140 may include a low pressure section 190. The low pressure section 190 may include at least one low pressure superheater 200, a low pressure header 205, and at least one low pressure economizer 210. Water and steam may be heated to superheated conditions via heat transfer from the hot gases channeled from the gas turbine exhaust manifold 120 through the heat recovery steam generator 110. The stack 130 may be coupled in flow communication with the heat recovery steam generator 110 to enable cooled exhaust gases to be exhausted therefrom. An optional emissions reduction device 220 and the like also may be used. Other components and other configurations may be used herein.

The gas turbine combined cycle facility 100 also may include at least one steam turbine 230 in a bottoming cycle 235. The steam turbine 230 also may have a number of pressure sections. An optional process or district heating system 240 also may be used. The gas turbine combined cycle facility 100 also may include a condensing system 250. The condensing system 250 may include any number of condensate pumps, feedwater pumps, deaerating units, piping, valving, and similar components. Other components and other configurations may be used herein.

The components of the gas turbine combined cycle facility 100 may be in communication via any number of lines 260 and valves 270. For example, the high pressure section 150 may be in communication with the steam turbine 230 via a high pressure admission valve 280 on a high pressure line 285. The low pressure section 190 may be in communication with the steam turbine 230 via a low pressure admission valve 290 on a low pressure line 295. The condensing system 250 may be in communication with the lower pressure section 190 via a condensate valve 300 on a condensing line 305. Flows within the heat recovery steam generator 110 may be controlled by a number of HRSG supply valves 310 on a number of supply lines 315. These lines 260 and valves 270 are shown herein by way of example only.

A number of bypass valves also may be used. A high pressure bypass valve 320 may be positioned on a high pressure bypass line 330 to bypass the steam turbine 230 and direct the flow to the condensing system 250. A low pressure bypass valve 340 may be positioned on a low pressure bypass line 350 to bypass the steam turbine 230 and direct the flow to the condensing system 250. A high pressure heating system valve 360 may be positioned on a high pressure heating system line 370 to bypass the steam turbine 230 and direct the flow to the heating system 240. A low pressure heating system valve 380 may be positioned on a low pressure heating system line 390 to bypass the steam turbine 230 and direct the flow to the heating system 240. A heating system valve 400 also may be positioned between the steam turbine 230 and the heating system 240. Other valves and the like may be used herein.

The gas turbine combined cycle system 100 also may include an energy control system 410 with an energy control computing device 420. The computing device 420 will be described in more detail below. The energy control system 410 may use any number of measurement devices or sensors 430 on the lines 260 or elsewhere as well as any number of control devices 440 in communication with the valves 270. The sensors 430 and the control devices 440 are in communication with the computing device 420. Other components and other configurations may be used herein.

The sensors 430 may determine flow, pressure, temperature, velocity, energy data, and/or other types of parameters. For example, a high pressure admission sensor 450 may be positioned on the high pressure line 285. A low pressure admission sensor 460 may be positioned on the low pressure line 295. Any number of section sensors 470 may be positioned about the heat recovery steam generator sections 140. An exhaust sensor 480 may be position upstream of the heat recovery steam generator 110. A condensing sensor 490 may be positioned about the condensing system 250. A heating sensor 500 may be positioned about the heating system 240. Any number of sensors 430 may be used herein in any suitable location.

Likewise, with respect to the control devices 440, a low pressure control device 510 may be in communication with the low pressure admission valve 290. A condensate control device 520 may be in communication with the condensate valve 300. Any number of supply control devices 530 may be in communication with the supply valves 310. A high pressure bypass control device 540 may be in communication with the high pressure bypass valve 320. A low pressure bypass control device 550 may be in communication with the low pressure bypass valve 340. A high pressure heating system control device 560 may be in communication with the high pressure heating system valve 360. A low pressure heating system control device 570 may be in communication with the low pressure heating system valve 380. A heating system control device 580 may be in communication with the heating system valve 400. Any number of control devices 440 may be used herein on any of the valves 270. The control devices 440 operate the valves 270 as desired from open to closed to any degree therebetween. Other components and other configurations may be used herein.

Figure 2:
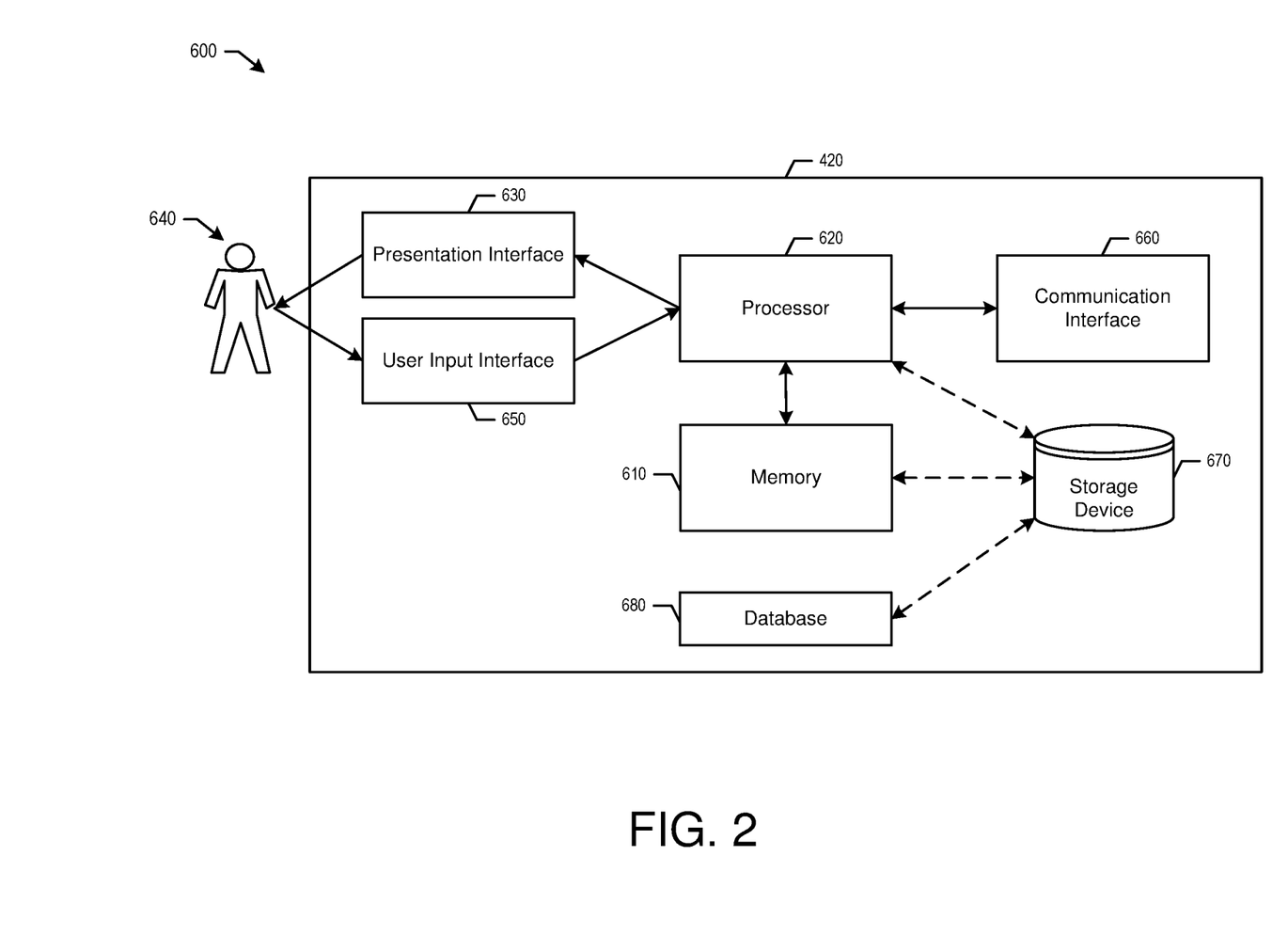
FIG. 2 is a schematic diagram of an exemplary computing system that may be used to adjust bottoming cycle steam pressure, flow, temperature levels, and/or other parameters in the gas turbine combined cycle facility of FIG. 1.

FIG. 2 is a block diagram 600 of an example of the computing device 420 that may be used to control gas turbine combined cycle facility 100 and the components thereof. Alternatively, any computer architecture that enables operation of the computing device 420 as described herein may be used.

The computing device 420 may include a memory device 610 and a processor 620 operatively coupled to memory device 610 for executing instructions. Executable instructions may be stored in the memory device 610. The computing device 420 may be configurable to perform one or more operations described herein by programming the processor 620. For example, the processor 620 may be programmed by encoding an operation as one or more executable instructions and providing the executable instructions in the memory device 610. The processor 620 may include one or more processing units, e.g., without limitation, in a multi-core configuration.

Further, the memory device 610 may be one or more devices that enable storage and retrieval of information such as executable instructions and/or other data. The memory device 610 may include one or more tangible, non-transitory computer-readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only and are thus not limiting as to the types of memory usable for storage of a computer program.

The computing device 420 may include a presentation interface 630 coupled to the processor 620. The presentation interface 630 may present information, such as a user interface and/or an alarm, to a user 640. For example, the presentation interface 630 may include a display adapter (not shown) that may be coupled to a display device (not shown), such as a cathode ray tube (CRT), a liquid crystal display (LCD), an organic LED (OLED) display, and/or a hand-held device with a display. The presentation interface 630 may include one or more display devices. In addition, or alternatively, the presentation interface 630 may include an audio output device (not shown), e.g., an audio adapter and/or a speaker.

The computing device 420 may include a user input interface 650. The user input interface 650 may be coupled to the processor 620 and may receive input from the user 640. The user input interface 650 may include, for example, a keyboard, a pointing device, a mouse, a stylus, and/or a touch sensitive panel, e.g., a touch pad or a touch screen. A single component, such as a touch screen, may function as both a display device of the presentation interface 630 and the user input interface 650.

Further, a communication interface 660 may be coupled to the processor 620 and may be configured to be coupled in communication with one or more other devices such as, without limitation, another computing device 420 or one or more sensors 430 such as those described above. Such sensors 430 may allow for monitoring of information in the combined cycle facility 100 including temperature levels, pressure levels, pressure differential levels, mass flow rates, enthalpies, and/or other parameters. Further, such sensors 430 may facilitate the detection of heat balance values that may be used to determine steam velocity levels. The communication interface 660 may include, without limitation, a wired network adapter, a wireless network adapter, a mobile telecommunications adapter, a serial communication adapter, and/or a parallel communication adapter. The communication interface 660 may receive data from and/or transmit data to one or more remote devices. The computing device 420 may be web-enabled for remote communications, for example, with a remote desktop computer (not shown).

The presentation interface 630 and/or the communication interface 660 may both be capable of providing information suitable for use with the methods described herein, e.g., to the user 640 or to another device. Accordingly, the presentation interface 630 and the communication interface 660 may be referred to as output devices. Similarly, the user input interface 650 and the communication interface 660 may be capable of receiving information suitable for use with the methods described herein and may be referred to as input devices.

The processor 620 and/or the memory device 610 also may be operatively coupled to a storage device 670. The storage device 670 may be any computer-operated hardware suitable for storing and/or retrieving data, such as, but not limited to, data associated with a database 680. The storage device 670 may be integrated in the computing device 420. For example, the computing device 420 may include one or more hard disk drives as the storage device 670. Moreover, the storage device 670 may include multiple storage units such as hard disks and/or solid state disks in a redundant array of inexpensive disks (RAID) configuration. The storage device 670 may include a storage area network (SAN), a network attached storage (NAS) system, and/or cloud-based storage. Alternatively, the storage device 670 may be external to the computing device 420 and may be accessed by a storage interface (not shown). The database 680 may contain a variety of static and dynamic operational data associated with controlling and monitoring the combined cycle facility 100.

Figure 3:
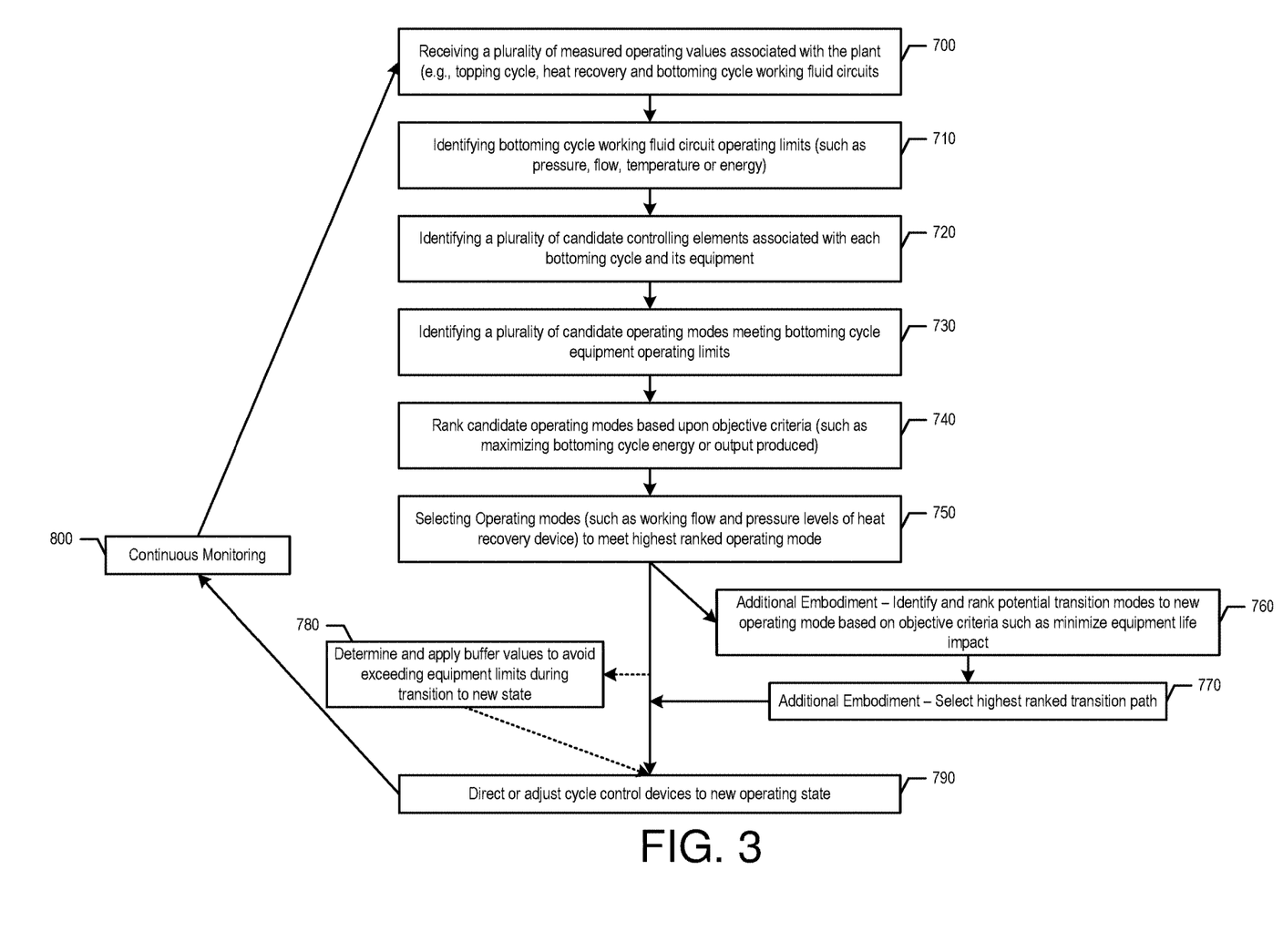
FIG. 3 is a flow chart showing an exemplary method of controlling the gas turbine combined cycle facility of FIG. 1 using the computing system of FIG. 2.

FIG. 3 shows a flow chart of exemplary steps in the operation of the energy control system 410. At step 700, the computing device 420 may receive a number of measured operating values associated with the combine cycle facility 100 from the sensors 430 such as topping cycle, heat recovery, and bottoming cycle working fluid circuits. At step 710, the computing device 420 may identify the bottoming cycle working fluid operating limits such as pressure, flow, temperature, or energy from the sensors 430. At step 720, the computing device 420 may identify a number of candidate controlling elements associated with each bottoming cycle 235 and related components. At step 730, the computing device 420 may identify a number of candidate operating modes meeting the bottoming cycle operating limits. At step 740, the computing device 420 may rank the candidate operating modes based upon objective criteria such as maximizing bottoming cycle energy or output. At step 750, the computing device 420 may select the operating modes such as working flow and pressure levels to meet the highest ranked operating mode. In an optional step 760, the computing device 420 may identify and rank potential transition modes to the new operating modes based on objective criteria such as maximizing equipment life impact. At optional step 770, the computing device 420 may select the highest ranked transition path. At a further optional step 780, the computing device 420 may determine and apply buffer values to avoid exceeding equipment limits during a transition to a new state. In all cases at step 790, the computing device 420 may direct or may adjust the control devices 440 to meet a new operating state by controlling the valves 270 as appropriate. During any or all of these steps, the computing device 420 may maintain continuous monitoring at step 800. The method steps described herein are exemplary only. Other and additional method steps may be used herein in any order.

Explained in more detail, the bottoming cycle equipment 235, e.g., the steam turbine 230, may not be able to accept all of the high pressure steam that could be produced by the heat recovery steam generator 110 from the topping cycle exhaust energy. For example, consider a plant configuration with five heat recovery steam generators 110 and two steam turbines 230. Also consider that one of the steam turbines 230 is out of service for planned or unplanned maintenance or due to a fault. The remaining steam turbine 230 may not be able to accept the steam flow produced by all of the heat recovery steam generators 110. In this operational scenario, without a bypass stack and damper for some or all of the heat recovery steam generators 110, the normal practice may be to bypass excess steam production to the condensing system 250. Under this operating scenario, the condenser pressure may exceed the operating limit of the steam turbine 230 and cause it to shut down. This eliminates any power produced by the steam turbine 230 and reduces the power output and efficiency of the overall combined cycle facility 100. However, under this operational scenario described herein, the computing device 240 may determine an operational configuration that is able to keep the steam turbine 230 operating at the highest possible power level.

In another example, when the topping cycle equipment 115 is upgraded or replaced, the topping cycle exhaust energy may be increased. Under certain operational scenarios, the steam produced and the resulting water demand may exceed the operational limits of the heat recovery steam generators 110, and the associated piping, valves, pumps, and other equipment. The computing device 240 thus may rank candidate operating modes by the amount of the bottoming process or power output produced. The computing device 240 then may compare the result of each operating mode with the equipment limits. The computing device 240 thus may select the highest ranked operating mode that meets all equipment limits and directs a controlled transition of the system to the new operating mode.

Specifically, candidate operating modes may include:

Bypass some or all of the water around the high pressure economizer 170 via one or more of the supply control devices 530 so as to reduce the production of high pressure steam. This may reduce the high pressure steam production to a level that the steam turbine 230 may process. Moreover, this bypass may increase low pressure steam production due to the higher amount of exhaust gas energy available to low pressure section 190.

Reduce the production of high pressure or low pressure steam by fully or partially bypassing water around the low pressure economizer 210 via one or more of the supply control devices 530. This bypass may reduce the pressure or flow in the low pressure section 190 to a level acceptable for continued operation of the heat recovery steam generator 110 or for steam turbine admission.

Raise the operating pressure in the low pressure section 190 via one or more of the supply control devices 530 so as to reduce low pressure steam production.

Bypass the low pressure superheater 200 via one or more of the supply control devices 530 so as to reduce low pressure steam temperature to a level acceptable to the steam turbine 230.

Bypass some or all water flow around the second high pressure economizer 180 via one or more of the supply control devices 530 so as to increase the low pressure steam temperature to a maximum acceptable temperature level to increase output of the steam turbine 230.

Bypass some or all of the steam flow around the steam turbine 230 via one or more of the bypass control devices 540, 550, 560, 570. This might be required if bypassing some or all the water around the selected economizers may cause the steam flow to exceed the flow that the steam turbine 230 may be able to accept.

Specifically, these steps may be accomplished by dynamically bypassing the sections of the heat recovery steam generator 110 by using the control devices 440 and altering the operating pressure of the lower pressure steam export circuits. Dynamic adjustments may be made to achieve the cycle and heat recovery steam generator 110 demands and/or respect limits as determined by the sensor 430 without exceeding operating limits.

In another embodiment, the computing device 240 may rank the transition of the bottoming cycle 235 to these new operating modes by their impact to equipment life expenditure. The computing device 240 then may select a path through the operating modes that minimizes the impact to equipment life. For example, quickly bypassing water around the high pressure economizer 170, 180 may cause a thermal shock at the water entrance to the high pressure drum 165 due to the sudden injection of cold water to a hot drum and connecting piping. If possible, it may be desirable to control the rate of change of temperature to minimize life consumption. In some cases, bypassing some or all of the high pressure steam flow around the steam turbine 230 may allow the steam turbine 230 to continue to run while water is increasingly bypassed around the high pressure economizer 170, 180 to control its life consumption. Although steam bypass is an operating mode that meets all equipment limits, such may not be the combination of operating modes that provides the highest steam turbine output. However, in utilizing the steam bypass during the transition, the bottoming cycle 235 may transition to the best combination of operating modes while extending overall bottoming cycle life.

In a further embodiment, the computing device 420 may control the transition of the bottoming cycle 235 to new operating modes when the proportion of the topping cycle exhaust energy that can be absorbed by the bottoming cycle equipment changes. For example, this may happen if the electrical output that can be consumed is reduced so as to require a reduction in topping cycle gas turbine electrical output with a corresponding decrease in topping cycle exhaust energy. With the reduction in topping cycle exhaust energy, it may be possible to rebalance the bottoming cycle 235 for maximum power output. This may be accomplished by increasing water flow to some or all economizers 170, 180, 210 via the section control devices 530. It is often desirable to the control the rate of change of temperature to minimize life consumption. For example, if the high pressure economizer 180 is fully bypassed, the temperature therein may rise to the exhaust gas temperature flowing therethrough. When cooler water is reintroduced at the inlet, this may cause a thermal shock to the economizer 180. It is thus desirable to control the rate of change of temperature to minimize life consumption.

In an additional embodiment, the computing device 420 may apply a buffer value to the input data, calculated data, or new directed system states to avoid exceeding equipment limits due to calculation uncertainty or transitory effects. For example, the candidate mode of bypassing the high pressure economizer 170 may be the highest ranked new operating mode. The computing device 420 may determine that 95% of the water should bypass this economizer 170. However, the computing device 420 may apply a buffer value of 5% to the calculated value to avoid overshooting the steam pressure target due to input data and/or calculation uncertainty and causing the steam turbine 230 to trip. In this example the amount of water bypassing the economizer 170 may be the calculated value of 95% plus the 5% buffer value for a total value of 100%. The buffer value may vary.

The system and methods described herein thus reduce or eliminate the plant output reductions caused by the existing known methods described above. The methods calculate the results of all candidate operating modes that may achieve the maximum plant output consistent with equipment limitations. In the examples above, it is possible to reduce high pressure steam production by bypassing one or more of the high pressure economizers 170, 180 to stay within the high pressure steam capacity of the single operating capacity. The choice of which economizer to bypass and the amount of bypass provides a different result. For example, fully or partially bypassing the hottest high pressure economizer 170 may provide an acceptable amount of high pressure steam. However, the steam temperature of the low pressure steam may increase above that acceptable to the steam turbine 230. The computing device 420 thus determine if this is the situation, and if so, can then determine the amount of steam bypassed around the low pressure superheater 200 to produce and acceptable steam temperature as well as determine expected plant output. An alternative solution may be fully or partially bypass the high pressure economizers 170, 180. With this solution, the low pressure steam temperature may be acceptable without bypassing the low pressure superheater 200. The computing device 420 determines if this solution is acceptable and determined expected plant output. The computing device 420 then ranks the plant output from this solution against the first solution. Example candidate operating modes are described below:

Many other types of differing operating scenarios may be used herein. The scenarios described herein are for the purpose of example only.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. An energy control computing device for adjusting one or more steam flow parameters of a flow of steam delivered to a steam turbine from a heat recovery steam generator via a plurality of control devices, the energy control computing device comprising a processor in communication with a memory, wherein the processor is programmed to:
   receive a plurality of measured operating values;
   identify steam turbine operating limits;
   identify a plurality of candidate operating modes meeting the steam turbine operating limits;
   select the candidate operating mode of the plurality of candidate operating modes maximizing the one or more steam flow parameters while not exceeding the steam turbine operating limits; and
   direct the plurality of control devices to meet the selected candidate operating mode.

| Candidate Mode | Description | HP Steam Outcome | LP Steam Outcome | Condenser Outcome | Relative Output | Rank |
|---|---|---|---|---|---|---|
| 1 | Bypass HP Economizer 170 | Acceptable | Unacceptable | Acceptable | NA- Outcome unacceptable | 99999 |
| 2 | Mode 1 + bypass LP superheater 200 | Acceptable | Temperature OK, Flow unacceptable | Acceptable | NA- Outcome unacceptable | 99999 |
| 3 | Mode 2 + bypass LP economizer 210 | Acceptable | Acceptable | Acceptable | 90% | 4 |
| 4 | Bypass HP Economizer 180 | Acceptable | Temperature Acceptable, Flow unacceptable | Acceptable | NA- Outcome unacceptable | 9999 |
| 5 | Mode 4 + bypass LP economizer 210 | Acceptable | Acceptable | Acceptable | 91% | 3 |
| 6 | Mode 2 + Partially bypass LP economizer 210 | Acceptable | Acceptable | Acceptable | 92% | 2 |
| 7 | Mode 4 + partially bypass LP economizer 210 | Acceptable | Acceptable | Acceptable | 93% | 1 |
| 8 | Bypass some HP steam around the steam turbine 230 | Acceptable | Unacceptable | Unacceptable | NA- Outcome unacceptable | 9999 |
| 9 | Mode 8 + partially bypass LP economizer 210 | Acceptable | Acceptable | Acceptable | 89% | 5 |

2. The energy control computing device of claim 1, wherein the processor is further programmed to control one or more valves to bypass one or more components of the heat recovery steam generator in whole or in part.

3. The energy control computing device of claim 2, wherein the one or more components of the heat recovery steam generator comprise a high pressure economizer.

4. The energy control computing device of claim 2, wherein the one or more components of the heat recovery steam generator comprise a low pressure economizer.

5. The energy control computing device of claim 2, wherein the one or more components of the heat recovery steam generator comprise a high pressure superheater.

6. The energy control computing device of claim 2, wherein the one or more components of a heat recovery steam generator comprises a low pressure superheater.

7. The energy control computing device of claim 2, wherein the one or more components of a heat recovery steam generator comprises a superheater and an economizer.

8. The energy control computing device of claim 1, further configured to control one or more valves to bypass one or more components of the steam turbine in whole or in part.

9. The energy control computing device of claim 1, wherein the step of selecting the candidate operating mode of the plurality of candidate operating modes maximizing the one or more steam flow parameters while not exceeding the steam turbine operating limits comprises ranking the candidate operating modes to maximize steam turbine output.

10. The energy control computing device of claim 1, where the one or more steam flow parameters comprise flow, pressure, temperature, velocity, and energy data.

11. The energy control computing device of claim 1, wherein the processor is programmed to apply one or more transition modes to meet the selected candidate operating mode.

12. The energy control computing device of claim 1, wherein the processor is programmed to apply a buffer to the selected candidate operating mode to avoid exceeding steam turbine operating limits.

13. The energy control computing device of claim 1, further comprising wherein the processor is programmed to continually monitor the plurality of measured operating values.

14. The energy control computing device of claim 1, wherein the processor is in communication with a plurality of heat recovery steam generators and a plurality of steam turbines.

15. A method of adjusting, via a processor, one or more steam flow parameters of a flow of steam delivered to a steam turbine from a heat recovery steam generator via a plurality of control devices in communication with a plurality of valves, the processor programmed to execute at least the following:
    receiving a plurality of measured operating values;
    identifying steam turbine operating limits;
    identifying a plurality of candidate operating modes meeting the steam turbine operating limits;
    selecting the candidate operating mode of the plurality of candidate operating modes maximizing the one or more steam flow parameters while not exceeding the steam turbine operating limits; and
    directing the plurality of control devices to adjust the plurality of valves to meet the selected candidate operating mode.

16. A combined cycle system, comprising:
    a heat recovery steam generator;
    a steam turbine in communication with the heat recovery steam generator; and
    an energy control system for adjusting one or more steam flow parameters of a flow of steam delivered to the steam turbine from the heat recovery steam generator via a plurality of control devices;
    the energy control system maximizing the one or more steam flow parameters of the flow of steam from the heat recovery steam generator without exceeding steam turbine operating limits;
    the energy control system comprising a processor in communication with a memory.

17. The combined cycle system of claim 16, wherein the processor is programmed to:
    receive a plurality of measured operating values;
    identify the steam turbine operating limits;
    identify a plurality of candidate operating modes meeting the steam turbine operating limits; and
    select the candidate operating mode of the plurality of candidate operating modes such that the energy control system maximizes the one or more steam flow parameters while not exceeding the steam turbine operating limits.

18. The combined cycle system of claim 17, wherein the processor is further programmed to direct the plurality of control devices to adjust a plurality of valves to adjust the flow of steam to meet the selected candidate operating mode.

19. The combined cycle system of claim 16, further comprising a plurality of heat recovery steam generators and a plurality of steam turbines.

* * * * *